United States Patent
Taylor

(10) Patent No.: US 10,528,940 B2
(45) Date of Patent: Jan. 7, 2020

(54) PIN SERVICING

(75) Inventor: David Taylor, London (GB)

(73) Assignee: BARCLAYS EXECUTION SERVICES LIMITED, London (GB)

( * ) Notice: Subject to any disclaimer, the term of this patent is extended or adjusted under 35 U.S.C. 154(b) by 2427 days.

(21) Appl. No.: 12/280,492

(22) PCT Filed: Feb. 19, 2007

(86) PCT No.: PCT/GB2007/000560
§ 371 (c)(1),
(2), (4) Date: Apr. 29, 2009

(87) PCT Pub. No.: WO2007/096590
PCT Pub. Date: Aug. 30, 2007

(65) Prior Publication Data
US 2010/0313027 A1    Dec. 9, 2010

(30) Foreign Application Priority Data
Feb. 23, 2006 (GB) .................................. 0603662.8

(51) Int. Cl.
*H04L 9/32* (2006.01)
*G06Q 20/34* (2012.01)

(52) U.S. Cl.
CPC .................. *G06Q 20/341* (2013.01)

(58) Field of Classification Search
CPC ....... G06F 21/31; G06F 21/77; G06Q 20/341; G07F 7/1008; G07F 7/1016
(Continued)

(56) References Cited

U.S. PATENT DOCUMENTS

| 4,801,787 A | 1/1989 | Suzuki |
| 5,590,198 A | 12/1996 | Lee et al. |
| 5,724,423 A * | 3/1998 | Khello ................. G06Q 20/341 380/46 |
| 5,754,655 A * | 5/1998 | Hughes et al. ................. 705/70 |

(Continued)

FOREIGN PATENT DOCUMENTS

| CN | 126094 A | 7/2000 |
| GB | 2 412 774 A | 10/2005 |

(Continued)

OTHER PUBLICATIONS

English language Translation of Official Notice of Rejection, dated Apr. 6, 2012, in Japanese Patent Application No. 2008-555858, filed Aug. 25, 2008.

(Continued)

*Primary Examiner* — Trong H Nguyen
*Assistant Examiner* — Amie C. Lin
(74) *Attorney, Agent, or Firm* — Foley & Lardner LLP

(57) ABSTRACT

A smart card (1) interfaces with a smart card reader (2) to generate an authentication message (PSRQ), which is sent to a PIN servicing centre (5, 6). If the authentication message (PSRQ) is validated by the PIN servicing centre (5, 6), a validation response message (PSRS) is sent back to the user (3). The user (3) enters the validation response message (PSRS) on the reader (2), which authenticates the validation response message (PSRS) with the smart card (1); the PIN servicing function may then be performed. The smart card cryptographic messages are generated internally and solely by the smart card (1)—the reader (2) acts merely as an input mechanism into the smart card (1) or as an output mechanism from the smart card (1) to the display (10). The reader (2), therefore, does not need to contain any customer information or be personalised by the card issuer.

16 Claims, 4 Drawing Sheets

(58) Field of Classification Search
USPC .......................................... 726/27; 713/180
See application file for complete search history.

(56) References Cited

U.S. PATENT DOCUMENTS

| | | | | |
|---|---|---|---|---|
| 5,826,166 | A * | 10/1998 | Brooks | H04N 7/17318 348/E5.005 |
| 6,070,794 | A * | 6/2000 | Niwata | G06K 7/0013 235/380 |
| 6,075,861 | A * | 6/2000 | Miller, II | 380/28 |
| 6,092,202 | A * | 7/2000 | Veil et al. | 726/27 |
| 6,179,205 | B1 | 1/2001 | Sloan | |
| 6,320,947 | B1 * | 11/2001 | Joyce | G06Q 20/00 379/112.01 |
| 6,607,127 | B2 * | 8/2003 | Wong | 235/451 |
| 6,729,550 | B2 | 5/2004 | Seita et al. | |
| 6,990,471 | B1 * | 1/2006 | Rajaram | 705/64 |
| 7,549,574 | B2 * | 6/2009 | Crowell et al. | 235/379 |
| 2002/0108051 | A1 * | 8/2002 | Fougeroux | G06Q 20/341 713/193 |
| 2002/0129257 | A1 * | 9/2002 | Parmelee et al. | 713/180 |
| 2003/0041244 | A1 * | 2/2003 | Buttyan | G06Q 20/20 713/172 |
| 2003/0055738 | A1 * | 3/2003 | Alie | 705/26 |
| 2003/0080851 | A1 * | 5/2003 | Gerstenkorn | B66B 1/468 340/5.22 |
| 2003/0217005 | A1 * | 11/2003 | Drummond | G06F 3/023 705/43 |
| 2005/0166061 | A1 | 7/2005 | Brookner et al. | |
| 2006/0031173 | A1 * | 2/2006 | Rajaram | 705/64 |
| 2006/0144925 | A1 * | 7/2006 | Jones | 235/380 |
| 2007/0233615 | A1 * | 10/2007 | Tumminaro | 705/75 |
| 2008/0154770 | A1 * | 6/2008 | Rutherford | G06Q 20/04 705/44 |

FOREIGN PATENT DOCUMENTS

| | | |
|---|---|---|
| JP | 02-032465 A | 2/1990 |
| JP | 06-150082 A | 5/1994 |
| JP | 10-154192 A | 6/1998 |
| JP | 11-003388 A | 1/1999 |
| JP | 2003-016398 A | 1/2003 |
| JP | 2003-085496 A | 3/2003 |
| JP | 2004-145500 A | 5/2004 |
| JP | 2005-258517 A | 9/2005 |
| JP | 2006-011968 A | 1/2006 |
| WO | WO 99/00775 A1 | 1/1999 |

OTHER PUBLICATIONS

English language Abstarct of Japanese Patent Publication No. JP 02-032465 A, Japanese Patent Office, Industrial Property Digital Library-Japanese Patent Office (1990).

English language Abstract of Japanese Patent Publication No. JP 06-150082 A, Japanese Patent Office, Industrial Property Digital Library-Japanese Patent Office (1994).

English language Abstract of Japanese Patent Publication No. JP 10-154192 A, Japanese Patent Office, Industrial Property Digital Library-Japanese Patent Office (1998).

English language Abstract of Japanese Patent Publication No. JP 11-003388 A, Japanese Patent Office, Industrial Property Digital Library-Japanese Patent Office (1999).

English language Abstract of Japanese Patent Publication No. JP 2003-016398 A, Japanese Patent Office, Industrial Property Digital Library-Japanese Patent Office (2003).

English language Abstract of Japanese Patent Publication No. JP 2003-085496 A, Japanese Patent Office, Industrial Property Digital Library-Japanese Patent Office (2003).

English language Abstract of Japanese Patent Publication No. JP 2004-145500 A, Japanese Patent Office, Industrial Property Digital Library-Japanese Patent Office (2004).

English language Abstract of Japanese Patent Publication No. JP 2005-258517 A, Japanese Patent Office, Industrial Property Digital Library-Japanese Patent Office (2005).

English language Abstract of Japanese Patent Publication No. JP 2006-011968 A, Japanese Patent Office, Industrial Property Digital Library-Japanese Patent Office (2006).

"Chip and PIN—Businesses and Organisations—Unlocking your PIN"—http://www.chipandpin.co.uk/business/represent/unlockign_pin.html (Oct. 26, 2015), 2 pages.

International Bureau of WIPO. PCT Notification Concerning Transmittal of International Preliminary Report on Patentability. Form PCT/IB/326. International Application No. PCT/GB2007/000560. Applicant Name: Barclays Bank PLC et al. 1 page, dated Sep. 4, 2008.

International Bureau of WIPO. PCT International Preliminary Report on Patentability. Form PCT/IB/373. International Application No. PCT/GB2007/000560. Applicant Name: Barclays Bank PLC et al. 1 pages, dated Aug. 26, 2008.

European Patent Office. PCT Written Opinion of the International Searching Authority. Form PCT/ISA/237. International Application No. PCT/GB2007/000560. Applicant Name: Barclays Bank PLC et al. 8 pages, dated Jul. 5, 2007.

European Patent Office. International Search Report dated Jul. 5, 2007. International Application No. PCT/GB2007/000560. International Filing Date: Feb. 19, 2007. Applicant: Barclays Bank PLC. 2 pages.

International Preliminary Report on Patentability in International Application No. PCT/GB2007/000560 dated Aug. 26, 2008 (9 pages).

International Search Report and Written Opinion in International Application No. PCT/GB2007/000560 dated Jul. 5, 2007 (10 pages).

International Search Report in International Application No. PCT/GB2007/000560 dated Jul. 5, 2007 (2 pages).

* cited by examiner

PIN SERVICING

CROSS-REFERENCE TO RELATED APPLICATIONS

This application is a U.S. National Stage entry of co-pending International Application No. PCT/GB2007/000560 filed on Feb. 19, 2007 by TAYLOR, David, entitled PIN SERVICING, the entire contents of which is incorporated by reference, and for which priority is claimed under 35 U.S.C. § 371. As in the parent International Application No. PCT/GB2007/000560, priority is also claimed to co-pending Great Britain Application No. 0603662.8 filed on Feb. 23, 2006 the entire contents of which is incorporated by reference and for which priority is claimed under 35 U.S.C. § 119.

FIELD OF THE INVENTION

The present invention relates to method and system for PIN servicing.

BACKGROUND OF THE INVENTION

In many transactions (financial or otherwise), a Personal Identification Number (PIN) is used to authenticate that the entity carrying out the transaction or service has proper authority to do so. Banks and credit card issuers provide their customers with a smart card containing a 'Reference PIN'. Commonly for these cards, during a transaction, the customer inputs their PIN into a smart card terminal such as a retailer point-of-sale device which in turn sends it to the smart card for comparison against the reference PIN held on the smart card. If the PIN sent by the terminal matches the Reference PIN, the authentication process has succeeded and it is deemed that the customer is the bona-fide holder of the smart card and, therefore, has the proper authority to carry out the transaction.

One of the problems in such a system is where the customer has forgotten the PIN. In this situation, the customer may attempt to guess the PIN and after a given number of invalid attempts (normally three) the smart card may become unusable i.e. unable to complete the current and any subsequent transactions. Although methods are available to render the smart card back to its original usable (unlocked) state, these methods normally involve the customer having to physically attend a specific secure terminal, most commonly the card issuer's or reciprocal Automated Teller Machine (ATM), and in the case where the PIN has been forgotten, the customer must first be re-advised of the PIN through the mailing of a secure letter containing the details of the PIN.

This situation is an inconvenience to customers as not only do they have to "unlock" their smart card at an ATM, but if the PIN has been forgotten there will be a delay before the re-advice of the PIN is received in the mail. The second problem is that for the bank or credit card issuing institution, there are costs associated with the inbound call from the customer to the call centre, the cost of issuing the PIN re-advice but, more importantly, the customer may defect to a competitor's product or use a different product where the PIN is known.

In another example, a SIM (Subscriber Identification Module) cards used in a digital mobile communication device, such a GSM (Groupe Speciale Mobile) 'phone, may be protected by a PIN so that the device can only be used when a valid PIN is entered. After a given number of invalid PIN entries, the SIM is locked and can only be unlocked by obtaining an unlocking code from the service provider, following authentication of user details.

Patent publication U.S. Pat. No. 6,179,205 discloses a system for locking and unlocking an application in a smart card without the need for a PIN, using a dedicated smart card reader. The reader authenticates itself to the device, and the application may be locked or unlocked using a dedicated button on the reader without the need to enter a PIN.

Patent publication U.S. Pat. No. 6,729,550 discloses a portable terminal with an IC card reader and means for locking/unlocking an IC card depending on authentication of a user by the portable terminal.

STATEMENT OF THE INVENTION

According to one aspect of the invention, there is provided a PIN servicing method in which a smart card interfaces with a smart card reader to generate an authentication message, which is sent to a PIN servicing centre. If the authentication message is validated by the PIN servicing centre, a validation response message is sent back to the user. The user enters the validation response message on the reader, which authenticates the validation response message with the smart card; the PIN servicing function may then be performed. For example, if the PIN servicing function is to disclose the reference PIN, then the PIN may be displayed on the smart card reader in response to authentication of the validation response message. If authentication is unsuccessful, the reader may display a suitable message.

Other PIN servicing functions may include changing the reference PIN held on the smart card to one selected by the user, resetting the number of PIN retries (i.e. unlocking the PIN after a given number of invalid entries) and/or resetting internal configurations or parameters held on the smart card.

The authentication and response messages preferably consist of dynamic one-time use codes such that the authentication and response messages vary on each PIN service function requested by the user. In a preferred implementation, the messages are generated using a cryptographic key and one or more counters held within the card using a symmetric key based cipher algorithm such as DES or AES. As the messages only work one time, this provides protection against a user legitimately obtaining a message value but writing it down or storing it, allowing it to be subsequently fraudulently replayed. In a preferred embodiment, the authentication request message and response message are mathematically derived and related so that in order for the PIN servicing function to succeed, the bona-fide smart card must have taken part in the generation of the original authentication message and the authentication of the response message. This binding of messages also protects against the transaction being 'torn' (i.e. messages used at different times from the original transaction) and ensures integrity as both the card and issuer systems mutually authenticate one another.

An important feature of embodiments of the invention is that the smart card cryptographic messages are generated internally and solely by the smart card—the reader acts merely as an input mechanism into the smart card or as an output mechanism from the smart card to the display (or if in a connected environment, to the connected upstream system). The reader, therefore, does not need to contain any customer information or be personalised by the card issuer and in an unconnected environment, the reader does not need to contain any physical security features other than a form of tamper evidence.

BRIEF DESCRIPTION OF THE DRAWINGS

Specific embodiments of the present invention will now be illustrated with reference to the accompanying drawings, as described below.

DETAILED DESCRIPTION OF THE EMBODIMENTS

Overview

Figure 1:
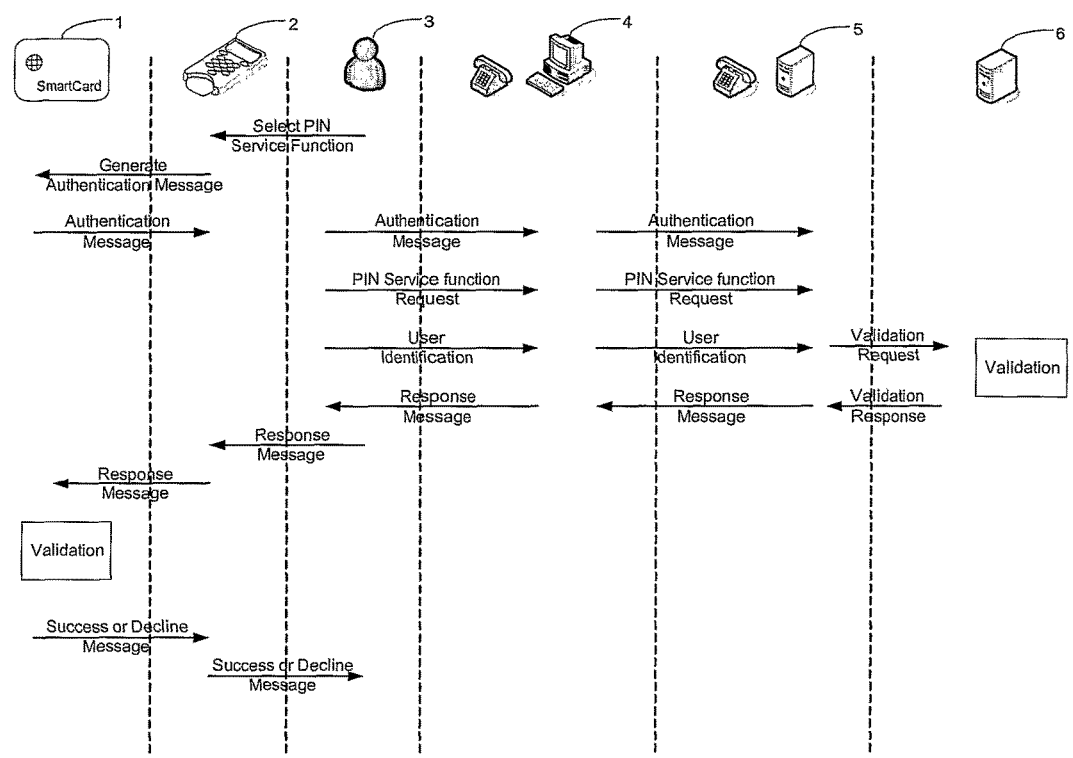
FIG. 1 is a schematic diagram of a method of PIN servicing in an embodiment of the present invention.

A method of PIN servicing according to an embodiment of the invention is shown schematically in FIG. 1. A user 3 inserts their smart card 1 into a reader 2 and selects the required PIN Servicing Function. The smart card 1 generates an authentication message which is displayed by the reader 2. The user 1 reads the authentication message from a display of the reader 2 and sends the authentication message, details of the requested PIN servicing function and information to identify the user (i.e. user identification information) via a user interface component 4 (such as a terminal connected to the internet or IVR (Interactive Voice Response) system or voice call using a telephone) to a request receiving component 5, such as a voice system, web server or IVR system.

The request receiving component 5 sends the information received to one or more validation components 6. The validation component 6 validates the authentication message and, where applicable, the information identifying the user requesting the PIN service. The validation component 6 then generates a validation response message, the contents of which may be dependent on the PIN servicing function requested by the user. The validation response message is transmitted to the request receiving component 5 which in turn relays the validation response message to the user interface component 4 and thereby back to the user 3.

The user 3 enters the validation response message into the reader 2 which transmits it to the smart card 1 for authentication. If the smart card 1 successfully validates the response message, a success message is generated and returned by the smart card to the reader 2, which success message is then displayed on the reader display. Otherwise, a decline message is generated and returned to the reader 2 for display. One or more success or decline messages may be used. The contents of the success or decline message will be context-specific to the PIN servicing function request and whether the validation was successful or not. For example, where the requested PIN servicing function is to return the value of the PIN stored on the smart card 1, the PIN would be sent back by the smart card 1 and displayed by the reader 2 in the success message.

Specific Details of the Embodiment

Figure 2:
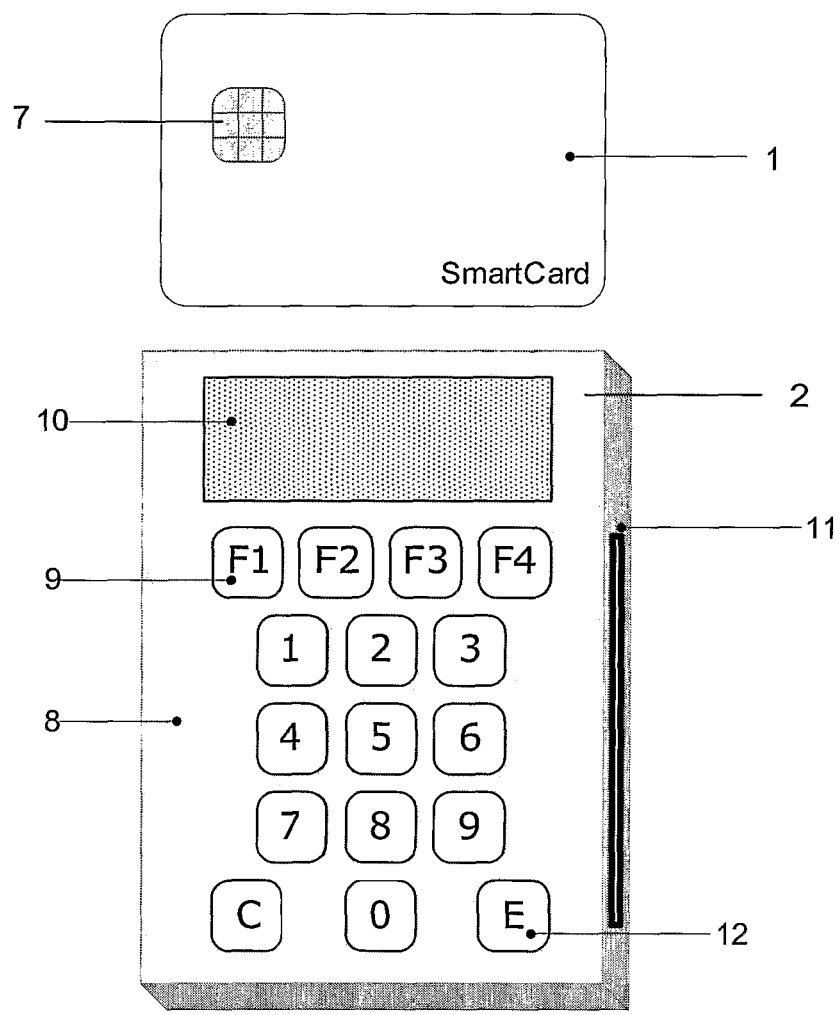
FIG. 2 is a representation of a smart card and a smart card reader in the embodiment.

FIG. 2 shows the details of the reader 2, which comprises a numeric keypad 8, function keys 9 corresponding to different PIN servicing functions, an enter key 12 for confirming entries, a display 10 for displaying messages and echoing key presses, and a smart card reader slot 11. Any smart card 1 conforming to the relevant standards (such as ISO-7816 or EMV) can be inserted into the smartcard reader slot 11 by the user. The smart card 1 includes contacts 7 for electrical connection to corresponding contacts within the slot 11, although a contactless connection may be used instead.

In an alternative embodiment, the functions of the reader 2 could be incorporated into the smart card 1: for example, the smart card may include the numeric keypad 8 and display 10. Whilst this arrangement would increase the complexity of the smart card and require an integrated power source, it is feasible with current technology and further technological advances are likely to make this arrangement more attractive.

In another alternative embodiment, the smart card 1 could include a wireless link interface, such as a Bluetooth™ interface, for connection to a wireless device having a keyboard and a display, which then functions as the reader 2. The wireless device could be a Bluetooth™-enabled smartphone or PDA (personal digital assistant), for example, that runs a reader application providing the functions of the reader 2.

In another alternative embodiment, the reader 2 could provide a wired or wireless interface to a device having a screen and a keyboard, such as a computer. For example, the reader 2 could comprise a smart card interface and a USB (universal serial bus) interface to the computer, which runs a reader application.

Figure 3:
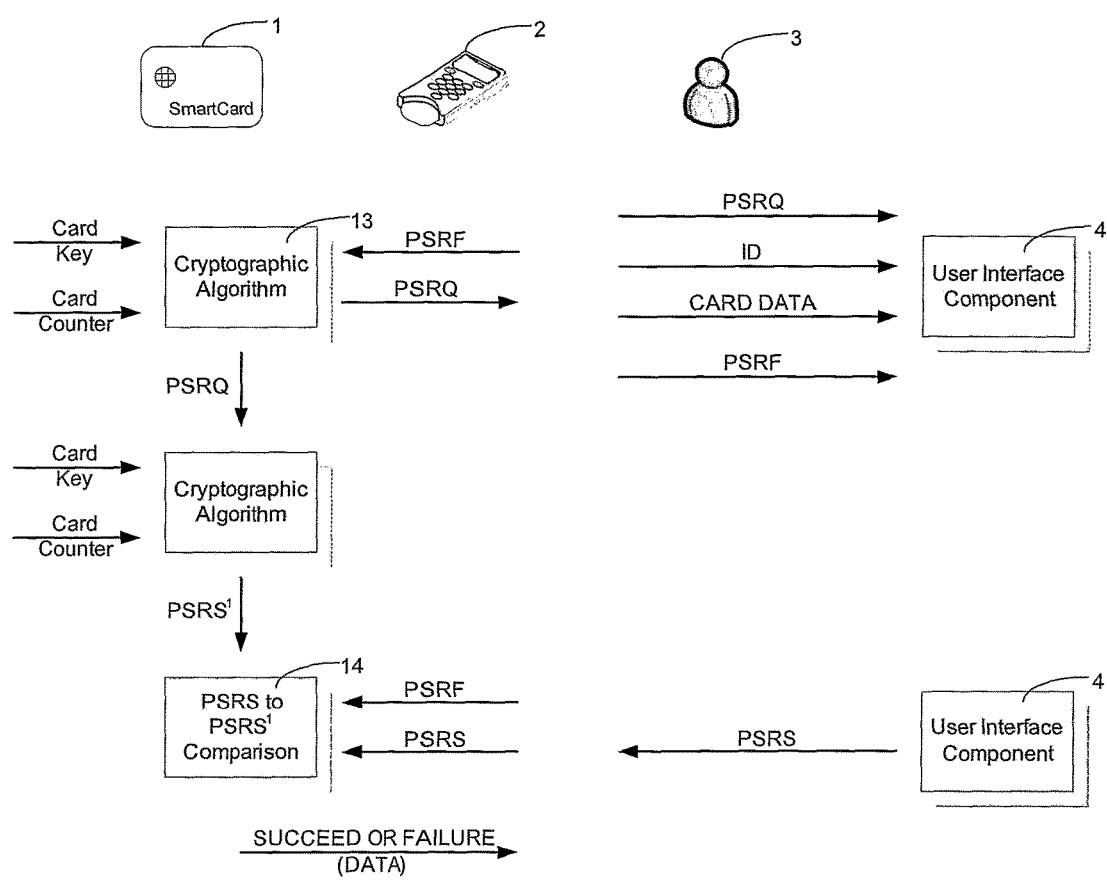
FIG. 3 is a more detailed diagram of the method as performed at the user side.
Figure 4:
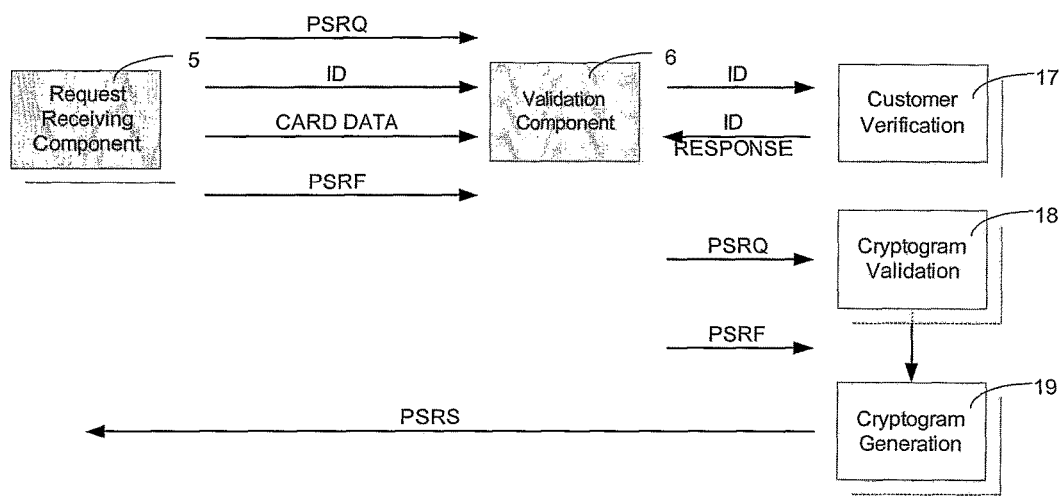
FIG. 4 is a more detailed diagram of the method as performed at the service centre side.

Referring now to FIGS. 3 and 4: to perform a PIN service function, the user 3 inserts the card 1 into the reader 2 and selects the required function using one of the function keys 9 on the reader 2. The reader 2 sends a request to the card 1 for it to generate a PIN Servicing Request Cryptogram (PSRQ) using a cryptographic algorithm 13 and a cryptographic key held internally within the card 1 and, preferably, including an incremental counter also held within the card 1. The PSRQ contains the result of the cryptographic process as well as sufficient details of the counter to be passed back to the validation component 6 to authenticate the cryptogram.

In some implementations, other data may also need to be contained within the PSRQ related to the cryptographic process, such as pointers to data elements required by the validation component 6 e.g. master cryptographic derivation keys. The PSRQ is returned by the card 1 to the reader 2, which displays the PSRQ on the reader display 10.

The PSRQ is passed by the user 3 to the request receiving component 5 via the user interface component 4, which may be, for example, a telephone, web form or other transmission device. As well as the PSRQ, the user 3 also sends to (or provides on request by) the request receiving component 5 the following:

User identification—comprising sufficient material for the validation component 6 to verify the identity of the user—such as date of birth, mother's maiden name and/or memorable words. The type of user identification may be requested by the receiving component 5 where this is interactive, such as a call centre agent or web page.

Card Data—for example, the card account number.

PIN Servicing Request Function (PSRF)—a mnemonic, phrase, word or code representing the PIN servicing function that the user 3 wants to perform.

Once received from the user interface component 4, the request receiving component 5 sends the data to the validation component 6; this may comprise a number of subcomponents or processes that verify the customer identification 17 by looking up expected values using the card data. In addition to this process, the validation component 6 passes the PSRQ, PSRF and card data to verify the card cryptogram to a cryptogram validation process 18. The cryptogram validation process 18 may retrieve data from the card database such as pointers to cryptographic master keys, algorithms and key indexes. The main objective of this part of the cryptogram validation process 18 is to ensure that the request from the user originates from a genuine card. To protect against the replaying of PSRQ messages in subsequent requests, in a preferred embodiment the cryptogram validation component 6 employs a process to keep track of historical card counters. Thus, if the counter transmitted in the PSRQ or derived from the PSRQ is found to be less or equal to the historically held value, then the process will abort.

If the cryptogram validation process has successfully verified the requesting cryptogram, a further cryptogram will be generated as a PIN service response message (PSRS) 19. In a preferred embodiment, the generation of the PSRS will use data from the original PSRF to cryptographically combine the request and response messages. The PSRS may also combine a value of the original PSRF to ensure that the PIN service response matches the request and also, for greater security, ensure that the PIN service requested by the user 3 cannot be changed into a different service or altered during the transaction, such as changing a PIN unlock function to a PIN display function.

The PSRS message generated by the cryptogram generation process 19 is transmitted to the user via the validation component 6 and the request receiving component 5. The user 3 submits the PSRS to the card 1 by typing it into the card reader keypad 8.

To validate the PSRS 14, the card uses the original PSRQ and PSRF to generate its own internal PSRS which it then compares to the PSRS transmitted by the reader 2. Dependent on the usability and display characteristics, the card 1 may have to compare the results of partial cryptograms—such as the rightmost 'n' bytes of the cryptogram where 'n' is either the maximum length of the reader display 10 or the maximum length of digits practical for the user 3. It may, for example, be deemed impractical for users to key in 8-byte cryptograms.

Successful validation requires that the PSRS internally calculated by the card 1 equals that received by the reader 2. If successful, dependent on the PSRF, the security access conditions internally maintained by the card will allow an internal smart card function to either change the PIN status to 'unlock' or transmit the 'Reference PIN' held in the smart card, dependent on the PIN service request. The PSRF therefore has a direct effect on the type of response from the smart card 1 to the reader 2—either an "OK/Success" status or the value of the clear text 'Reference PIN'.

Alternative Embodiments

The embodiments described above are illustrative of rather than limiting to the present invention. Alternative embodiments apparent on reading the above description may nevertheless fall within the scope of the invention.

The invention claimed is:

1. A method of performing a personal identification number (PIN) service for a smart card, comprising:
    receiving, at a card reader, a selected PIN service request from a selection of a plurality of possible PIN service functions, wherein each of the plurality of possible PIN service functions is concurrently available, wherein the card reader solely receives, transmits, and displays requests and messages from a user, the smart card, and a user interface component;
    in response to the card reader receiving the selected PIN service request, communicating, by the user interface component, to a PIN servicing facility an authentication message having a smart card cryptographic message generated internally and solely by the smart card as a function of the selected PIN service request;
    receiving, at the user interface component, from the PIN servicing facility a response message to the authentication message;
    validating, by the smart card, the response message against the selected PIN service request.

2. The method of claim 1, wherein the smart card cryptographic message comprises a one time cryptogram.

3. The method of claim 1, wherein the communicating to the PIN servicing facility the authentication message includes transmitting to the PIN servicing facility user identification information identifying an authorized user of the smart card.

4. The method of claim 1, wherein the validating the response message includes providing the response message to the smart card by means of the card reader.

5. The method of claim 1, further comprising displaying a PIN service message indicating successful validation.

6. The method of claim 5, wherein the PIN service message indicates a value of a reference PIN.

7. The method of claim 6, wherein the PIN service message indicating successful validation is displayed by the card reader connected to the smart card.

8. The method of claim 1, wherein the smart card validates the response message by generating its own internal PIN service response message and comparing its own internal PIN service response message to a PIN service response message transmitted by the card reader.

9. The method of claim 1, further comprising, at the PIN servicing facility validating the authentication message and generating the response message in response to successful validation of the authentication message and in response to the communicating to the PIN servicing facility the authentication message,
    wherein the receiving from the PIN servicing facility the response message to the authentication message is in response to the validating the authentication message and the generating the response message.

10. The method of claim 9, wherein the authentication message includes a component that varies between PIN service requests for the smart card according to a predetermined relationship, and the authentication message is validated against the predetermined relationship.

11. The method of claim 1, wherein the user selects one of a plurality of keys, each corresponding to a different one of the plurality of possible PIN service functions, so as to select said one of the plurality of possible PIN service functions.

12. The method of claim 1, wherein a one of the plurality of possible PIN service functions is to unlock a reference PIN held in the smart card.

13. A system for performing a PIN service function, comprising:
    a smart card having a reference PIN and internally and solely generating a cryptographic message as a function of a selected PIN service request;
    a reader connectable to the smart card for a user initiating the selected PIN service request according to a selected one of a plurality of possible PIN service functions;

and a user interface component,
  wherein the reader receives the selected PIN service request;
  wherein each of the plurality of possible PIN service functions is concurrently available to the user,
    wherein the reader solely receives, transmits, and displays requests and messages from a user, the smart card, and the user interface component;
    wherein in response to the reader receives the selected PIN service request, the user interface component sends an authentication message having the cryptographic message to a PIN servicing facility and receives from the PIN servicing facility a response message to the authentication message;
    wherein the smart card validates the response message against the selected PIN service request.

14. The system of claim 13, including said PIN servicing facility arranged to validate the authentication message and to generate the response message in response to successful validation of the authentication message.

15. The system of claim 13, wherein the reader includes a plurality of function keys for selection of a corresponding one of the plurality of possible PIN service functions.

16. A non-transitory computer-readable medium encoded with computer-implemented instructions, that, when executed by a computer, cause the computer to:
  initiate, by a user at a card reader, a selected PIN service request by selecting one of a plurality of possible PIN service functions, wherein each of the plurality of possible PIN service functions is concurrently available to the user;
  receiving, at the card reader, the selected PIN service request;
  wherein the card reader solely receives, transmits, and displays requests and messages from a user, a smart card, and a user interface component;
  in response to the card reader receiving the selected PIN service request, communicating, by the user interface component, to a PIN servicing facility an authentication message having a smart card cryptographic message generated internally and solely by the smart card as a function of the selected PIN service request;
  receiving, at the user interface component, from the PIN servicing facility a response message to the authentication message;
  validating, by the smart card, the response message against the selected PIN service request.

\* \* \* \* \*